Sept. 15, 1931.　　　　H. H. MORRIS　　　　1,822,933
LITHOPONE MANUFACTURE
Filed Aug. 25, 1927
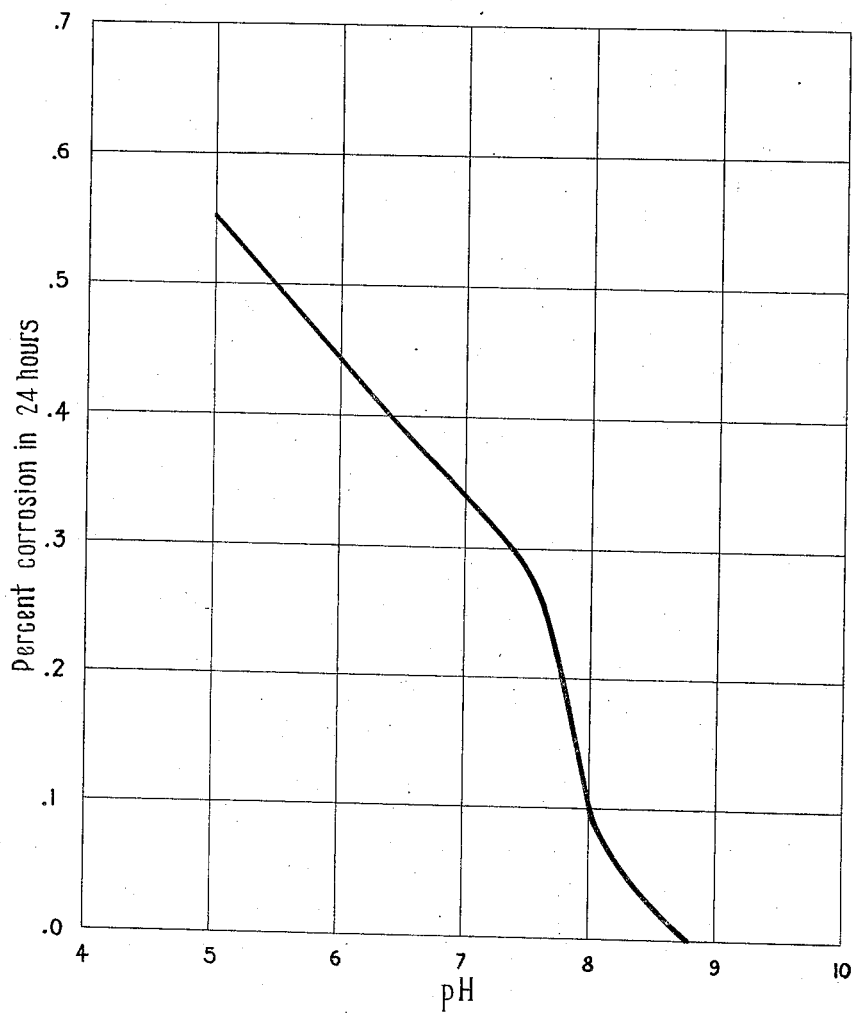
H. H. Morris Inventor
By his attorney
F. A. Cross Patented Sept. 15, 1931

1,822,933

UNITED STATES PATENT OFFICE

HAROLD H. MORRIS, OF NEWARK, NEW JERSEY, ASSIGNOR, BY MESNE ASSIGNMENTS, TO KREBS PIGMENT & COLOR CORPORATION, OF WILMINGTON, DELAWARE, A CORPORATION OF DELAWARE

LITHOPONE MANUFACTURE

Application filed August 25, 1927. Serial No. 215,294.

This invention relates to an improvement in lithopone manufacture and particularly to control of raw pigment precipitation to an end point which will avoid corrosion of galvanized-metal equipment.

It has been customary in lithopone manufacture to conduct the precipitation with a slight excess of zinc sulphate solution. The zinc liquor has been run into the strike tub and the then so called barium liquor added until present in amount almost equivalent to the original zinc sulphate. If the end point was overrun more zinc sulphate was added until a slight excess was present.

Modern plant installations for treating, filtering and drying lithopone raw pigment include equipment of galvanized metal which is attacked by the slurry, resulting in serious discoloration of the pigment produced. Besides a rapid corrosion of the metal equipment, there results a great loss in material and a serious interference with plant production.

The loss in weight of a galvanized festoon was determined while immersed in various raw pigment slurries, the slurry being placed in a three gallon enameled can and maintained at the boiling point. The festoon section was fastened to a stirring mechanism and the whole test continued for a twenty-four hour period. The determining factor in the corrosion of the galvanized coating was found to be the pH of the slurry used. The corrosion was very serious in slurries made with an excess of zinc sulphate and showing a pH below 7. As the pH increased the corrosion fell off until it became inappreciable at 8.8. A slurry with a higher pH than 8.8 caused no measurable loss in weight during the twenty-four hour test period. Pigments obtained from slurries above 10 pH are regarded as too strongly alkaline for practical use and no data is being submitted on test in this region.

This invention has as an object the control of the alkalinity of raw pigment slurry with the view of preventing corrosion of galvanized-metal equipment. A further object of this invention is the production of lithopone of improved color.

These objects are accomplished by the following invention. To the raw pigment slurry produced in the usual manner is added an alkaline solution to bring the pH to 8.8 or above. At this alkalinity no appreciable corrosion of zinc or galvanized surfaces will occur in contact with the slurry.

As the end point is approached the slurry is tested for an excess of barium sulphide. This test is made by removing a dipper-full of the slurry and adding a drop of nickel sulphate solution. The presence of sulphide is indicated by the appearance of a brown or black spot on the surface of the slurry. After the first test for sulphide has been obtained the pH of the slurry is also determined. This is done by the use of indicators covered in "Color chart of indicators" reprinted from "The determination of hydrogen ions," by William Mansfield Clark. The addition of barium sulphide is continued until the pH has increased to 9-9.6. The preferred indicator for this range of pH is thymol blue. After this end point has been obtained the slurry is agitated for one half an hour and if necessary additional barium sulphide added to maintain the desired pH. At the end of this period the slurry is ready for filtration and drying by the usual means. The equipment described below is preferred in my practice.

The following example indicates by way of illustration an embodiment of the present invention:

A sample of raw lithopone slurry was taken from the plant operation. It had a pH of 6.5. One portion was left at this pH, another portion was adjusted to a pH of 9 by addition of barium liquor. Galvanized festoon sections were then rotated in each slurry for twenty-four hours at approximately 100° C. The loss in weight of the festoon at pH 6.5 was 0.375 per cent whereas at pH 9 there was less than 0.02 per cent loss. The galvanized festoon carried about 6 per cent of its weight in the zinc coating. Consequently at 0.375 per cent loss per day total failure would occur in slightly over two weeks. This agreed well with actual plant experience.

A further series of tests is illustrated in the curve represented in the accompanying drawing.

It will be noted that with a pH of 5. the loss in weight was relatively very large or slightly over 0.55 per cent. With a neutral slurry of pH 7. the loss had decreased to 0.34 per cent. From this point it dropped off rapidly until it approached zero at 8.8 pH. Above 8.8 pH for the range investigated it remained inappreciable.

The desired high pH may be reached by the use of other alkaline materials instead of an excess of barium sulphide liquor. In such case, the addition of barium sulphide is interrupted when the first faint test for an excess of sulphide is obtained. Following this there may be added other alkaline solutions, such as sodium hydroxide, sodium carbonate, barium hydroxide, ammonium hydroxide, a slurry of precipitated magnesium hydroxide containing a slight excess of caustic, etc. In general, any basic materials can be used which will raise the pH above 8.8 without introducing other complications, such as injurious effect upon the pigment.

As many apparently widely different embodiments of this invention may be made without departing from the spirit thereof, it is to be understood that I do not intend to limit myself to the specific embodiments thereof except as indicated in the appended claims.

I claim:

1. In the process of producing a raw lithopone slurry which includes mixing solutions of zinc sulphate and barium sulphide, and involves the use of galvanized equipment, the step which comprises adding to the precipitating mixture an alkaline material in sufficient amount to give said mixture a pH value of about 8.8 and thereby prevent corrosion of said equipment.

2. In a process of producing a raw lithopone slurry which includes mixing solutions of zinc sulphate and barium sulphide and involves the use of galvanized equipment, the step which comprises adding to the precipitating mixture barium sulphide in sufficient excess to give the resulting mixture a pH value of about 8.8 and thereby preventing corrosion of said equipment.

In testimony whereof I affix my signature.

HAROLD H. MORRIS.